US006774156B2

(12) United States Patent
Debras et al.

(10) Patent No.: US 6,774,156 B2
(45) Date of Patent: Aug. 10, 2004

(54) PRODUCTION OF PROPYLENE COPOLYMERS HAVING IMPROVED PROPERTIES

(75) Inventors: Guy Debras, Frasnes-lez-Gosselies (BE); Marc Dupire, Mons (BE); Jacques Michel, Seneffe (BE)

(73) Assignee: ATOFINA Research S.A., Feluy (BE)

( * ) Notice: Subject to any disclaimer, the term of this patent is extended or adjusted under 35 U.S.C. 154(b) by 0 days.

(21) Appl. No.: 10/332,029

(22) PCT Filed: Jun. 27, 2001

(86) PCT No.: PCT/EP01/07307

§ 371 (c)(1),
(2), (4) Date: Sep. 2, 2003

(87) PCT Pub. No.: WO02/02658

PCT Pub. Date: Jan. 10, 2002

(65) Prior Publication Data

US 2004/0068024 A1 Apr. 8, 2004

(30) Foreign Application Priority Data

Jul. 5, 2000 (EP) .............................................. 00202346

(51) Int. Cl.[7] .................................................. C08J 3/28
(52) U.S. Cl. ........................ 522/157; 522/161; 522/113
(58) Field of Search ................................. 522/157, 161, 522/158, 160, 113

(56) References Cited

U.S. PATENT DOCUMENTS

| | | | |
|---|---|---|---|
| 2,948,666 A | 8/1960 | Lawton | |
| 5,047,446 A | 9/1991 | DeNicola, Jr. | |
| 5,414,027 A | 5/1995 | DeNicola, Jr. et al. | |
| 5,560,886 A | 10/1996 | Saito et al. | |
| 5,731,362 A | 3/1998 | Scheve et al. | |
| 5,820,981 A | 10/1998 | Williams et al. | |
| 6,136,926 A | * 10/2000 | Raetzsch et al. ............. | 525/254 |
| 6,632,854 B1 | * 10/2003 | Charlier ....................... | 522/157 |
| 6,699,919 B1 | * 3/2004 | Charlier ....................... | 522/149 |

\* cited by examiner

*Primary Examiner*—Susan Berman
(74) *Attorney, Agent, or Firm*—William D. Jackson

(57) ABSTRACT

A process for producing a propylene copolymer having increased melt strength, the process comprising irradiating a copolymer of propylene and ethylene which has been polymerised using a Ziegler-Natta catalyst with an electron beam having an energy of at least 5 MeV and a radiation dose of at least 10 kGray and melting and mechanically processing the melt of the irradiated ethylene propylene copolymer to form long chain branches on the ethylene propylene copolymer molecules.

10 Claims, 1 Drawing Sheet

PRODUCTION OF PROPYLENE COPOLYMERS HAVING IMPROVED PROPERTIES

Figure 1:
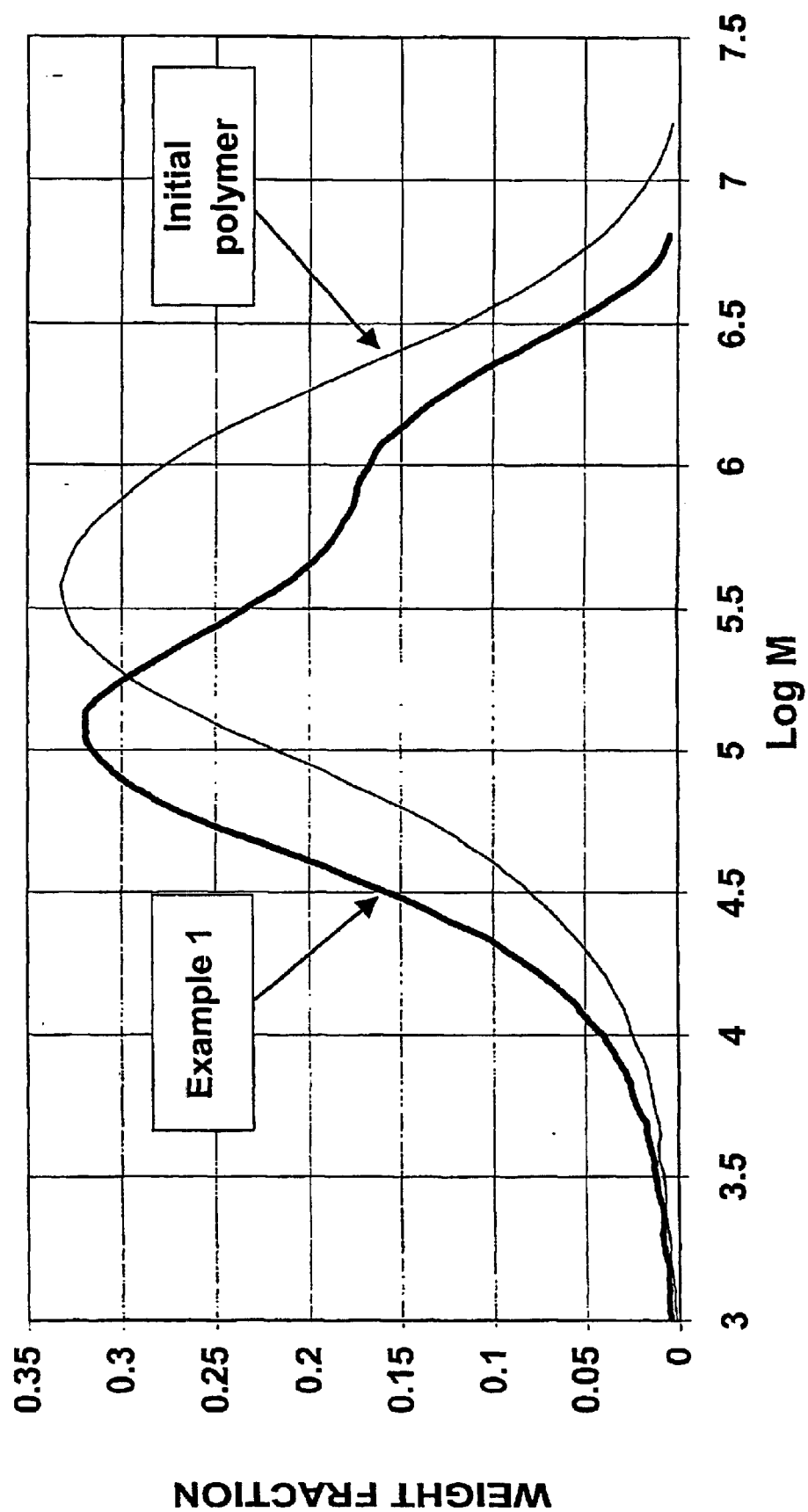

The present invention relates to a method for the production of propylene copolymers, in particular propylene/ethylene random copolymers or heterophasic (multiple phase) copolymers, for example comprising an ethylene propylene rubber phase in a propylene copolymer matrix phase, having improved properties, in particular high melt strength. In particular, the present invention relates to a process for the production of polypropylene/ethylene random copolymers or heterophasic copolymers having improved properties by irradiating polypropylene/ethylene random or heterophasic copolymers with a high energy electron beam.

Propylene copolymer resins are used in a variety of different applications. However, linear propylene copolymers resins suffer from the problem of having a low melt strength at high melt index, which restricts their use in a number of applications because they are difficult to process. It is known in the art to increase the melt strength of polypropylene, for example by irradiating the propylene copolymer with an electron beam. It is known that electron beam irradiation significantly modifies the structure of a propylene copolymer molecule. The irradiation of propylene copolymers results in chain scission and grafting (or branching) which can occur simultaneously. Up to a certain level of irradiation dose, it is possible to produce from a linear polypropylene copolymers molecule having been produced using a Ziegler-Natta catalyst, a modified polymer molecule having free-end long branches, otherwise known as long chain branching.

It is known that such long chain branching drastically modifies the rheological behaviour of the polypropylene, for example their elongational and shear viscosity.

EP-A-0678527 discloses a process for producing a modified polypropylene in which polypropylene and a cross-linking agent mixture are irradiated with ionising radiation so as to give an absorbed dosage of 1 to 20 kGy, with subsequent heat-treating of the resultant material. In Example 1 it is disclosed that the irradiation conditions have an accelerated voltage of 2 MW and an electric current of 1.0 mA.

WO-A-97/08216 discloses a method for producing diene-modified propylene polymers which are irradiated. It is disclosed that the irradiation is preferably carried out using E-beam or γ radiation at a dose of about 1 to about 20 Mrad for a few seconds. It is disclosed that polypropylene made be modified with a diene and then irradiated to cause chain extension.

EP-A-0634441 discloses a process for making a high melt strength propylene polymer by high energy radiation. The dose range is disclosed as being from 1 to 10,000 Mrads per minute and it is disclosed that the ionising radiation should have sufficient energy to penetrate to the extent desired in the mass of linear, propylene polymer material being radiated. There is also disclosed the use of an accelerating potential (for an electron generator) of 500 to 4000 kV. Following the irradiation step the irradiated material is heated.

EP-A-0190889 discloses a process similar to that of EP-A-0634441 in that it is disclosed that the accelerating potential of an electron generator may be from 500 to 4000 kV.

EP-A-0799839 also has a similar disclosure to EP-A-0634441 and discloses the use of an electron generator having accelerating potential of 500 to 4000 kV.

EP-A-0451804 discloses a method of increasing the molecular weight of syndiotactic polypropylene by irradiation in the absense of oxygen. This specification does not disclose any energy range for the irradiation. The dose of the irradiation may be from 0.1 to 50 Mrad. After irradiation, the polypropylene may be heated.

EP-A-0351866 has a yet further similar disclosure to EP-A-0634441 and discloses the use of an electron generator having an accelerating potential of 500 to 4000 kV.

U.S. Pat. No. 5,554,668 discloses a process for irradiating polypropylene to increase the melt strength thereof. An increase in the melt strength is achieved by decreasing the melt flow rate, otherwise known as the melt index. It is disclosed that a linear propylene polymer material is irradiated with high energy ionising radiation, preferably an electron beam, at a dose rate in the range of from about 1 to $1 \times 10^4$ Mrads per minute for a period of time sufficient for a substantial amount of chain scission of the linear, propylene polymer molecule to occur but insufficient to cause gelation of the material. Thereafter, the material is maintained for a period of time sufficient for a significant amount of long chain branches to form. Finally, the material is treated to deactivate substantially all free radicals present in the irradiated material. It is disclosed that for an electron beam, the electrons are beamed from an electron generator having an accelerating potential (i.e. an energy) of from 500 to 4000 kV. Typically, the polypropylene material to be irradiated is in particulate form and is conveyed on a conveyor belt beneath an electron beam generator which continuously irradiates the polypropylene particles as they are translated thereunder by the conveyor belt. The resultant polyethylene has improved melt strength as represented by a decrease in the melt flow rate. A disadvantage of the process disclosed in U.S. Pat. No. 5,554,668 is that the production rate of the irradiated polypropylene is relatively low, because the speed of the conveyor belt is low and only a small volume of material is processed. This results in difficulties in commercial implementation of the process. In addition, the specification discloses the use of a very broad range of dose rates i.e. from 1 to $1 \times 10^4$ Mrads per minute. High dose rates of greater than about 40 Mrad can result in a substantially fully cross-linked structure of the polypropylene. Such a cross-linked structure is difficult to process.

EP-A-0520773 discloses an expandable polyolefin resin composition including polypropylene optionally blended with polyethylene. In order to prepare a cross-linked foam, a sheet of expandable resin composition is irradiated with ionising radiation to cross-link the resin. The ionising radiation may include electron rays, at a dose of from 1 to 20 Mrad. It is disclosed that auxiliary cross-linking agents may be employed which include a bifunctional monomer, exemplified by 1,9-nonanediol dimethyacrylate.

U.S. Pat. No. 2,948,666 and U.S. Pat. No. 5,605,936 disclose processes for producing irradiated polypropylene. The latter specification discloses the production of a high molecular weight, non-linear propylene polymer material characterised by high melt strength by high energy irradiation of a high molecular weight linear propylene polymer. It is disclosed that the ionising radiation for use in the irradiation step may comprise electrons beamed from an electron generator having an accelerating potential of 500 to 4000 kV. For a propylene polymer material without a polymerised diene content, the dose of ionising radiation is from 0.5 to 7 Mrad. For propylene polymer material having a polymerised diene content, the dose is from 0.2 to 2 Mrad.

EP-A-0821018 discloses the preparation of cross linkable olefinic polymers which have been subjected to ionising radiation. The specification exemplifies electron beams of relatively low energy and low doses to split polymeric chains in order to graft silane derivatives onto the polymeric chain. The specification does not address the problem of achieving high melt strength of polymers.

EP-A-0519341 discloses the grafting of vinyl monomers on particulate olefin polymers by irradiating the polymer and treating with a grafting monomer. In an example, polypropylene is irradiated with an electron beam having an energy of 2 MeV and subsequently treated with maleic anhydride as a grafting monomer.

U.S. Pat. No. 5,411,994 discloses the production of graft copolymers of polyolefins in which a mass of olefin polymer particles is irradiated and thereafter the mass is treated with a vinyl monomer in liquid form. The ionising radiation dose is about 1 to 12 Mrad and the ionising radiation preferably comprises electrons beamed from an electron generator having an accelerating potential of 500 to 4000 kV. The polymer is first irradiated and then treated with a grafting agent.

EP-A-0792905 discloses the continuous production of polypropylene mixtures of increased stress crack resistance and melt strength by the action of ionising radiation. The energy of the ionising radiation is from 150 to 300 keV and the radiation dose ranges from 0.05 to 12 Mrad.

It is further known that when irradiating isotactic polypropylene which has been produced using conventional Ziegler-Natta catalysts, the irradiation of the polypropylene with an electron beam produces free radicals and there is a competition between chain scission and branching which is in favour of chain scission. It is known to use branching agents, for example multi-vinylic compounds, to displace the equilibrium towards the achievement of branching. For example CA-A-2198651 discloses that bifunctional, unsaturated monomers can be added before and/or during the irradiation. Such compounds may include divinyl compounds, alkyl compounds, dienes or mixtures thereof. These bifunctional, unsaturated monomers can be polymerised with the help of free radicals during the irradiation. Butadiene is particularly preferred. CA-A-2198651 also discloses a continuous method for producing polypropylene mixtures of increased stress-crack resistance and melt strength in which a low-energy electron beam accelerator with an energy of from 150 to 300 keV at a radiation dose of 0.05 to 12 Mrads is employed. This process also suffers from the disadvantage that the production rate of the irradiated powder can be somewhat low for commercial acceptance. Moreover, the polypropylene powder to be irradiated must be in the form of very fine particles. The use of such branching (or grafting) agents leads to the disadvantages of increased cost and increased possibility of environmental problems, in particular toxicity, as a result of adding branching or grafting agent to the polypropylene.

It is also known to irradiate propylene copolymers of propylene and dienes, for example 1,5-hexadiene, after their polymerisation.

The present invention aims to provide a process for producing propylene copolymer resins, having improved properties, in particular improved melt strength, and also optionally which can be manufactured at a high production rate. It is another aim of the present invention to provide a process for producing propylene copolymers which avoids the need for a branching or grafting reagent during or following an irradiation step. It is also an aim of the invention to provide such a process which provides substantially increased long chain branching on the propylene copolymer molecules following the irradiation. It is a further aim to produce random or heterophasic propylene copolymers having improved melt strength.

Accordingly, the present invention provides a process for producing a propylene copolymer having increased melt strength, the process comprising irradiating a copolymer of propylene and ethylene which has been polymerised using a Ziegler-Natta catalyst with an electron beam having an energy of at least 5 MeV and a radiation dose of at least 10 kGray and melting and mechanically processing the melt of the irradiated ethylene propylene copolymer to form long chain branches on the ethylene propylene copolymer molecules.

The present invention is predicated on the discovery by the present inventor that high irradiation energy electron beams cause a modification of the molecular weight distribution of ethylene-propylene copolymers, for example by forming a bimodal molecular weight distribution, which can lead to an increase in the melt strength of the irradiated copolymers. The use of such high energy irradiation can also enable high throughput of ethylene-propylene copolymer to be irradiated without the need for a branching or grafting agent, thereby making irradiation more commercially useful and with reduced environmental or toxicity problems. The irradiation causes the formation of free radicals in the ethylene-propylene copolymer chains particularly at the ethylene sites in a propylene/ethylene random copolymer chain. The secondary carbon sites are more sensitive to free radical formation than the tertiary carbon sites. When the irradiated polymer is subsequently mechanically processed or worked in the melt, for example by extrusion, in the absence of a grafting or branching agent this causes recombination between free radicals, creating long chain branching without the need for a branching or grafting agent.

Preferably, the propylene copolymer is irradiated at an energy of at least 10 MeV.

The propylene copolymer may be an isotactic propylene copolymer, a syndiotactic propylene copolymer, or a blend of isotactic and syndiotactic propylene copolymers. Most particularly, the copolymer comprises a random or heterophasic ethylene propylene copolymer which has been polymerised using a Ziegler-Natta catalyst (hereinafter referred to as "ZNiPP copolymer"). The ethylene propylene copolymers may have a monomodal molecular weight distribution or a multimodal molecular weight distribution, for example a bimodal molecular weight distribution. The increase in melt strength as a result of the irradiation process can yield a melt strength for the ethylene propylene copolymer which is similar to that of a polyethylene of similar melt flow index. This production of higher melt strength propylene copolymers enables the propylene copolymers to be used in a variety of different applications where melt strength is required when the polymer is processed from the melt, for example in blow moulding, blowing of films, extrusion thermoforming and in the production of foams.

The ethylene-propylene copolymer may contain up to 10 wt % ethylene, most particularly around 1 wt % ethylene. The ethylene-propylene copolymer may be a random block copolymer. The ethylene-propylene copolymer may be used as a matrix phase of a heterophasic polymer which is toughened by rubber particles, for example ethylene-propylene copolymer rubber particles, typically in an amount of up to 30 wt %.

In the irradiation process, typically the propylene copolymer is deposited onto a continuously moving conveyor such as an endless belt. The propylene copolymer on the conveyor passes under an electron beam generator which irradiates the propylene copolymer. Preferably, the accelerating potential or energy of the electron beam is from 5 to 100 MeV, still more preferably at least 10 MeV, yet more preferably from 10 to 25 MeV. The power of the electron beam generator is preferably from 50 to 500 kW more preferably for 120 to 250 kW. The radiation dose to which the propylene copolymer is subjected is preferably from 25 to 50 kGray, preferably around 50 kGray (10 kGray is equivalent to 1 Mrad). The conveyor speed is adjusted in order to achieve the desired dose. Typically, the conveyor speed is from 0.5 to 20 meters/minute, preferably from 1 to 10 meters/minute, more preferably from 2.25 to 8.5 meters/minute.

As a result of the high irradiating potential of the electron beam, not only can the conveyor speed be significantly higher than in the prior art, but also the thickness of the continuously moving bed of propylene copolymer on the conveyor can be relatively high. Typically, the bed of propylene copolymer has a thickness of up to 20 cm, most particularly from 5 to 10 cm. The bed of propylene copolymer on the conveyor typically has a width of up to about 1 meter. Preferably, the irradiation is carried out under an inert atmosphere, such as nitrogen.

After irradiation by the electron beam, the propylene copolymer powder can be annealed and then treated with at least one known antioxidant additive. The annealing temperature may range from 50 to 150° C. more preferably from 80 to 120° C. and the annealing time may range from 1 to 60 minutes, more preferably from 5 to 30 minutes. Thereafter the propylene copolymer is mechanically processed, e.g. by extrusion, and granulated.

In accordance with a preferred aspect of the invention, the irradiated ethylene propylene copolymers have increased melt strength. This particular rheological property provides an outstanding processing behaviour which allows the ethylene propylene copolymers produced in accordance with the invention to be suitable particularly for producing films, sheets, fibres, pipes, foams, hollow articles, panels and coatings. The irradiated ethylene propylene copolymer also has improved mechanical properties, such as flexural modulus and impact resistance, and improved rheological properties such as recovery compliance and relaxation time.

The invention will now be described in greater detail with reference to the following non-limiting example and the accompanying drawing, in which:

FIG. 1 is a graph showing the molecular distributions of the random ethylene propylene copolymer of Example 1 both before and following irradiation.

EXAMPLE 1

In this Example, an isotactic random copolymer of propylene with 0.8 wt % ethylene was produced using a Ziegler-Natta catalyst. The copolymer had a melt flow index (MFI) of 0.3 dg/min. In this specification, the melt flow index (MFI) is measured by the procedure of ASTM D 1238 using a load of 2.16 kg at a temperature of 230° C. for polypropylene.

The propylene copolymer was then subjected to electron beam irradiation. Prior to irradiation, the copolymer fluff was stabilised with 200 ppm Irganox 1076. In particular, the copolymer was deposited onto an endless belt conveyor having a speed of 2.2 m/minute. The copolymer powder was deposited onto the conveyor having a thickness of 7 cm. The conveyor conveyed the bed under a high energy high power electron accelerator. Such accelerators are available in commerce. The accelerator had an energy of 10 MeV and a power of 120 kW. The copolymer powder was irradiated for a period of time (determined by the conveyor speed) sufficient to provide a radiation dose of 60 kGray. During the irradiation, the powder was maintained under argon (or nitrogen) to exclude oxygen.

After irradiation, the powder was kept under nitrogen and was mixed with conventional antioxidant additives comprising 700 ppm Irganox 1010, 1100 ppm Irgafos 168 and 400 ppm calcium stearate.

After the addition of the antioxidant additives, the powder was extruded and granulated at 220° C. under an argon atmosphere.

The properties of the irradiated random polypropylene copolymer of Example 1 and of the initial non-irradiated copolymer are shown in Table 1.

The MFI of a sample of the initial non-irradiated copolymer of Example 1 and of a sample of the copolymer of Example 1 after having been irradiated were measured and the results are shown in Table 1. The irradiation dose increased the MFI but within an acceptable range.

In addition, for the irradiated sample of Example 1, the molecular weight distribution was determined by gel permeation chromatography and the resultant molecular weight distribution curve is shown in FIG. 1.

It may be seen that the irradiation causes a shifting to the lower molecular weight side leading to a decrease in the average molecular weight. Moreover, a second peak in the molecular weight distribution on the high molecular weight side appears in the high molecular weight region, leading to a bimodal molecular weight distribution for the irradiated random polypropylene copolymer. Thus the high irradiation dose at high molecular weight causes the formation of large molecules giving a second peak in the high molecular weight end of the molecular weight distribution.

It is believed that two actions occur simultaneously as a result of the irradiation. Chain scission which is represented by the low molecular weight peak causes shifting of the peak towards lower molecular weight as the irradiation dose increases. The width of the low molecular weight peak is decreased by the irradiation. In addition, the formation of long chain branching leads to the appearance of a high molecular weight peak which extends towards the lower molecular weight side. The dispersion index D decreases from 8.5 for the unirradiated polypropylene copolymer to a dispersion index of 7.2 for the irradiated polypropylene copolymer. The irradiation cuts the polymer chain but at the same time permits more recombination to form branched polymers having a high molecular weight at increasing irradiation doses. It is believed that the ethylene sites in the polymer chain are more sensitive to free radical formation, thereby enhancing the long chain branching and leading to a bimodal molecular weight distribution. The difference between the non-irradiated and irradiated materials can be expressed as the % area above the maximum peak value ($M_p$) in the molecular weight distribution curves. From FIG. 1 and Table 1, it may be seen that the proportion of the material having a molecular weight greater than Mp was 49.5% for the non-irradiated material and 57.2% for the irradiated material. For the gel permeation chromatography of branched molecules, the measured molecular weight tends to be underestimated compared to linear molecules.

The melt strength of the unirradiated polypropylene copolymer and the irradiated polypropylene copolymer of Example 1 was then measured at 210° C. and 250° C. The melt strength was measured using a CEAST rheometer (Rheoscope 1000) equipped with a capillary die and a rotating wheel as a take-up device. Molten polymer was extruded through the capillary die by application of a pressure resulting from the displacement of a piston. The molten extrudate was uniaxially stretched before crystallisation by wrapping the fibre around the rotating wheel. In the test, the piston displacement rate was fixed and the speed of the rotating take-up wheel was linearly changed at constant acceleration until the fibre, becoming very thin, breaks. The tensile force was recorded during the test. The test was run with a cylindrical die having a length/diameter ratio of 5 mm/1 mm. The diameter of the rotating wheel was 120 mm and the displacement rate of the piston was 2 mm/min giving an extrudate throughput of 2.36 mm$^3$/min. The acceleration of the rotating wheel was constant at 10 rpm/100 seconds, or 0.000628 m/s$^2$. The extrusion temperature was 210° C. or 250° C. During the melt strength experiments, the recorded force rapidly obtained a constant value that remained independent of wheel rpm up to rupture.

The melt strength was defined as the maximum tensile force recorded during the experiment. The melt strength values for the unirradiated and irradiated polypropylene copolymer samples are shown in Table 1. It may be seen that the melt strength increases with irradiation. From the GPC analysis, the molecular weight of random polypropylene copolymer increases with the irradiation dose, and the increase in long chain branching correspondingly increased the melt strength.

Table 1 shows the activation energy for the unirradiated copolymer and the irradiated copolymer of Example 1. The activation energy represents the energy necessary to activate the molecule to move in the melt. It may be seen that with irradiation, the activation energy increases. This indicates that long chain branching increases with irradiation, since this is manifested in the increased activation energy.

COMPARATIVE EXAMPLE 1

In this Comparative Example a propylene homopolymer was irradiated at a dose of 60 kGray and a grafting agent comprising 2500 ppm tetravinyl silane was added prior to irradiation. The properties of the resultant polymer of Comparative Example 1 were tested and the results are shown in Table 1. It may be seen that even with the addition of a branching or grafting agent to the polypropylene homopolymer in accordance with Comparative Example 1, the melt strength is lowered as a result of the irradiation and also is significantly less than that for Example 1. The activation energy of the irradiated polypropylene homopolymer of Comparative Example 1 is also reduced as compared to Example 1, showing reduced long chain branching.

TABLE 1

| Polymer | EXAMPLE 1 | | COMPARATIVE EXAMPLE 1 | |
|---|---|---|---|---|
| | Initial Copolymer | Irradiated Copolymer | Initial Copolymer | Irradiated Copolymer |
| Irradiation dose (kGray) | 0 | 60 | 0 | 60 |

TABLE 1-continued

| Polymer | EXAMPLE 1 | | COMPARATIVE EXAMPLE 1 | |
|---|---|---|---|---|
| | Initial Copolymer | Irradiated Copolymer | Initial Copolymer | Irradiated Copolymer |
| C2 (wt %) | 0.8 | 0.8 | 0 | 0 |
| Tetravinyl silane (ppm) | 0 | 0 | 2500 | 2500 |
| MFI (dg/min) | 0.3 | 9.2 | 1.2 | 12.5 |
| Mn (kDa) | 86.4 | 53.1 | — | — |
| Mp (kDa) | 377 | 130 | — | — |
| Mw (kDa) | 734 | 383 | — | — |
| Mz (kDa) | 2792 | 1456 | — | — |
| D | 8.5 | 7.2 | — | — |
| D' | 3.8 | 3.8 | — | — |
| Melt Strength @ 210° C. (mN) | 13.2 | 33 | — | — |
| Melt Strength @ 250° C. (mN) | 6.3 | 14 | 10 | 8 |
| Ea (kJ/mole) | 39 | 92.4 | 41 | 69 |
| % > Mp | 49.5 | 57.2 | — | — |

What is claimed is:

1. A process for producing a propylene copolymer having increased melt strength, the process comprising irradiating a copolymer of propylene and ethylene which has been polymerised using a Ziegler-Natta catalyst with an electron beam having an energy of at least 5 MeV and a radiation dose of at least 10 kGray and melting the irradiated ethylene propylene copolymer and mechanically processing the melt of the copolymer to form long chain branches on the ethylene propylene copolymer molecules.

2. A process according to claim 1 wherein the electron beam has an energy of at least 10 MeV.

3. A process according to claim 1 wherein the electron beam has an energy within the range of 10–25 MeV.

4. A process according to claim 1 wherein the power of the electron beam is from 50 to 500 kW.

5. A process according to claim 1 wherein the power of the electron beam is from 120 to 250 kW.

6. A process according to claim 1 wherein the radiation dose is within the range of 25–50 kGray.

7. A process according to claim 1 wherein the ethylene-propylene copolymer comprises ethylene in an amount of up to 10 wt %.

8. A process according to claim 7 wherein the ethylene-propylene copolymer comprises about 1 wt % ethylene.

9. A process according to claim 1 wherein the ethylene propylene copolymer is at least one of the matrix phase and the dispersed phase of a heterophasic polymer.

10. A process according to claim 1 wherein the ethylene-propylene copolymer is a random block copolymer.

* * * * *